(12) United States Patent
Takahashi

(10) Patent No.: US 9,141,312 B2
(45) Date of Patent: Sep. 22, 2015

(54) INFORMATION PROCESSING APPARATUS, SYSTEM AND CONTROL METHOD FOR TRANSMITTING DATA ENABLING SELECTION OF AN IMAGE TO BE TRANSMITTED

(71) Applicant: CANON KABUSHIKI KAISHA, Tokyo (JP)

(72) Inventor: Takumi Takahashi, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/905,837

(22) Filed: May 30, 2013

(65) Prior Publication Data
US 2013/0258121 A1 Oct. 3, 2013

Related U.S. Application Data

(63) Continuation of application No. 12/988,281, filed as application No. PCT/JP2009/060300 on May 29, 2009, now Pat. No. 8,471,913.

(30) Foreign Application Priority Data

Jun. 3, 2008 (JP) ................................. 2008-146221

(51) Int. Cl.
*G06F 3/12* (2006.01)
*G06F 3/00* (2006.01)
(Continued)

(52) U.S. Cl.
CPC *G06F 3/12* (2013.01); *G06F 3/005* (2013.01); *G06F 3/1206* (2013.01);
(Continued)

(58) Field of Classification Search
CPC ......... G06F 3/12; G06F 3/005; G06F 3/1206; G06F 3/1292; G06F 3/1247; G06F 3/1236; G06F 3/1209; H04N 1/00278; H04N 5/23293; H04N 5/23241; H04N 5/765; H04N 5/907; H04N 9/8227; H04N 5/775
USPC ........ 348/207.99, 207.1, 207.2, 211.1–211.3, 348/222.1, 231.2, 333.05, 333.11, 372, 348/14.01, 231.99, 376; 358/1.6, 1.15, 401, 358/403, 527, 906, 909.1; 455/41.2; 320/106; 715/838; 235/375
See application file for complete search history.

(56) References Cited

U.S. PATENT DOCUMENTS 6,552,743 B1 4/2003 Rissman ..................... 348/207.2
7,027,172 B1 4/2006 Parulski et al. .............. 358/1.15
(Continued)

FOREIGN PATENT DOCUMENTS

JP 2005-109584 A 4/2005
JP 2006-020078 A 1/2006
(Continued)

*Primary Examiner* — Dennis Hogue
(74) *Attorney, Agent, or Firm* — Fitzpatrick, Cella, Harper & Scinto

(57) ABSTRACT

In an information processing apparatus for transmitting and receiving information via a communication medium established relative to an external apparatus, it is determined whether the information to be transmitted and subject to specific processing in the external apparatus is selected or not. If it is determined that the information to be transmitted is selected, the selected information is transmitted via the communication medium. If it is determined that the information is not selected, designation information indicating the information selectable subject to transmission is transmitted via the communication medium. Then, the information designated by the designation information received in response to the transmission of the selection information is transmitted to the external apparatus via the communication medium.

19 Claims, 9 Drawing Sheets

(51) Int. Cl.
*H04N 1/00* (2006.01)
*H04N 5/232* (2006.01)
*H04N 5/765* (2006.01)
*H04N 5/907* (2006.01)
*H04N 9/82* (2006.01)
*H04N 5/775* (2006.01)
*H04N 5/77* (2006.01)

(52) U.S. Cl.
CPC ........... *G06F 3/1209* (2013.01); *G06F 3/1236* (2013.01); *G06F 3/1247* (2013.01); *G06F 3/1292* (2013.01); *H04N 1/00278* (2013.01); *H04N 5/23241* (2013.01); *H04N 5/23293* (2013.01); *H04N 5/765* (2013.01); *H04N 5/772* (2013.01); *H04N 5/775* (2013.01); *H04N 5/907* (2013.01); *H04N 9/8227* (2013.01); *H04N 2201/006* (2013.01); *H04N 2201/0015* (2013.01); *H04N 2201/0084* (2013.01)

(56) References Cited

U.S. PATENT DOCUMENTS

| | | | |
|---|---|---|---|
| 7,411,608 B1 | 8/2008 | Moskaluk et al. | 348/207.2 |
| 7,639,299 B2 | 12/2009 | Maniwa et al. | 348/333.01 |
| 2002/0051074 A1* | 5/2002 | Kawaoka et al. | 348/376 |
| 2002/0109733 A1 | 8/2002 | Watanabe et al. | 345/838 |
| 2004/0212822 A1 | 10/2004 | Schinner | 358/1.15 |
| 2004/0259499 A1 | 12/2004 | Oba et al. | 455/41.2 |
| 2005/0001024 A1* | 1/2005 | Kusaka et al. | 235/375 |
| 2006/0114339 A1* | 6/2006 | Ohmura et al. | 348/231.99 |
| 2006/0132616 A1 | 6/2006 | Tanaka et al. | 348/211.3 |
| 2006/0158152 A1 | 7/2006 | Taniguchi et al. | 320/106 |
| 2006/0227344 A1 | 10/2006 | Fujisawa | 358/1.1 |
| 2007/0047012 A1 | 3/2007 | Bryant | 358/403 |
| 2007/0058074 A1* | 3/2007 | Yamagishi | 348/372 |
| 2007/0149124 A1* | 6/2007 | Onozawa | 455/41.2 |
| 2007/0242285 A1* | 10/2007 | Ahn | 358/1.6 |
| 2008/0231684 A1* | 9/2008 | Underwood et al. | 348/14.01 |
| 2008/0284855 A1 | 11/2008 | Umeyama et al. | 348/207.1 |
| 2009/0153692 A1* | 6/2009 | Koide | 348/222.1 |

FOREIGN PATENT DOCUMENTS

| | | |
|---|---|---|
| JP | 2006-157392 A | 6/2006 |
| JP | 2006-311484 A | 11/2006 |
| JP | 2007-052555 A | 3/2007 |
| JP | 2007-221272 A | 8/2007 |

* cited by examiner

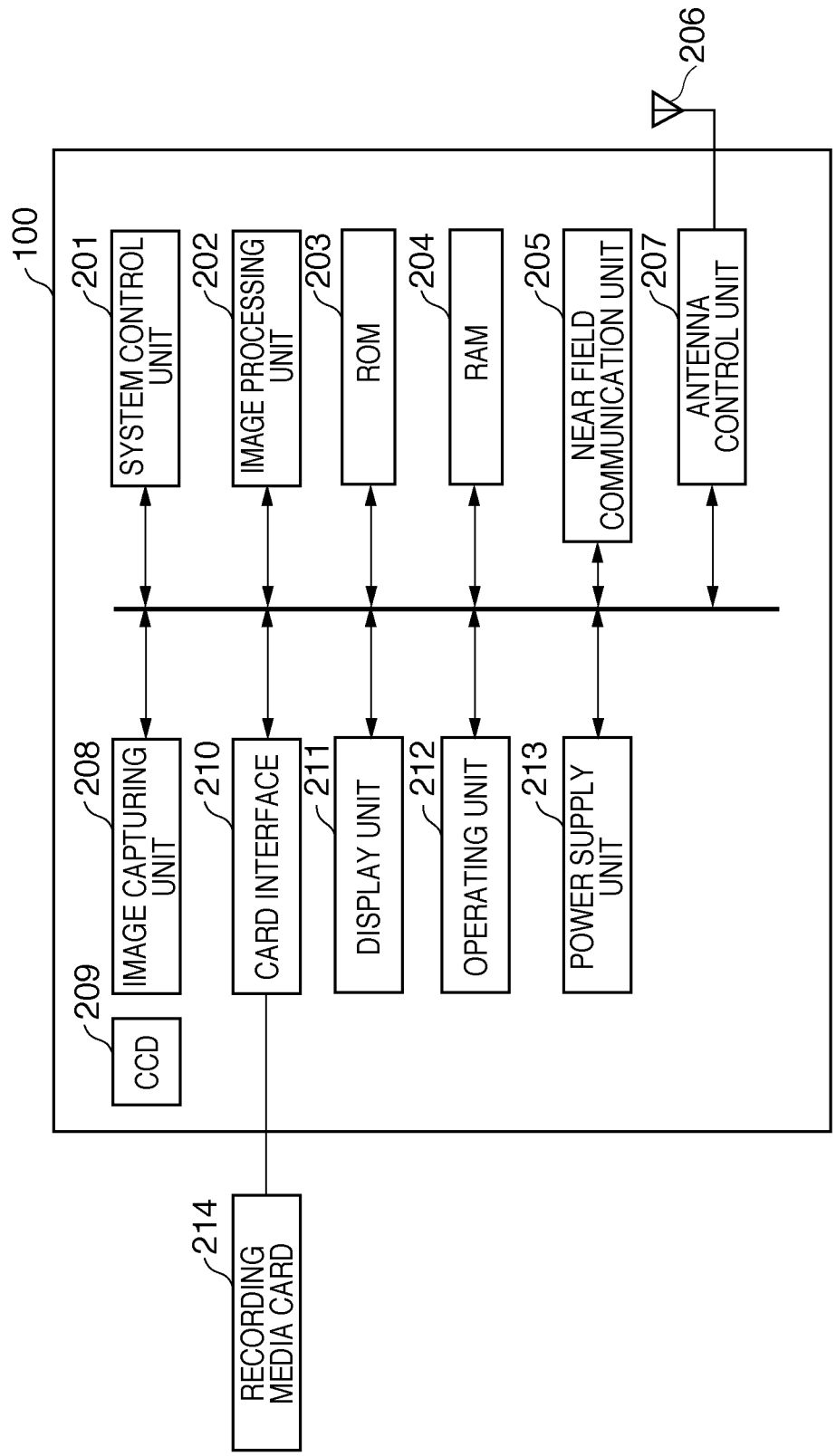

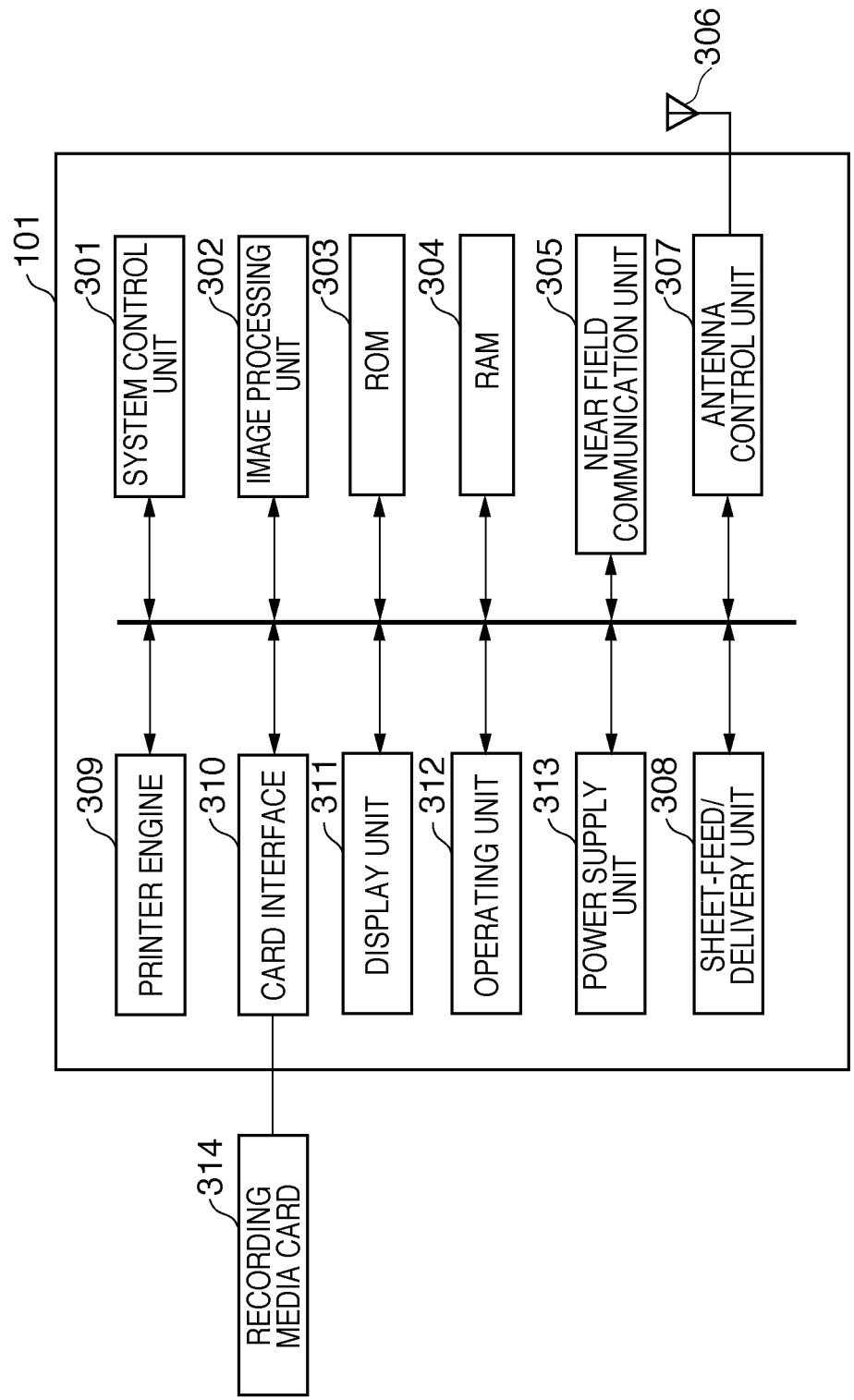

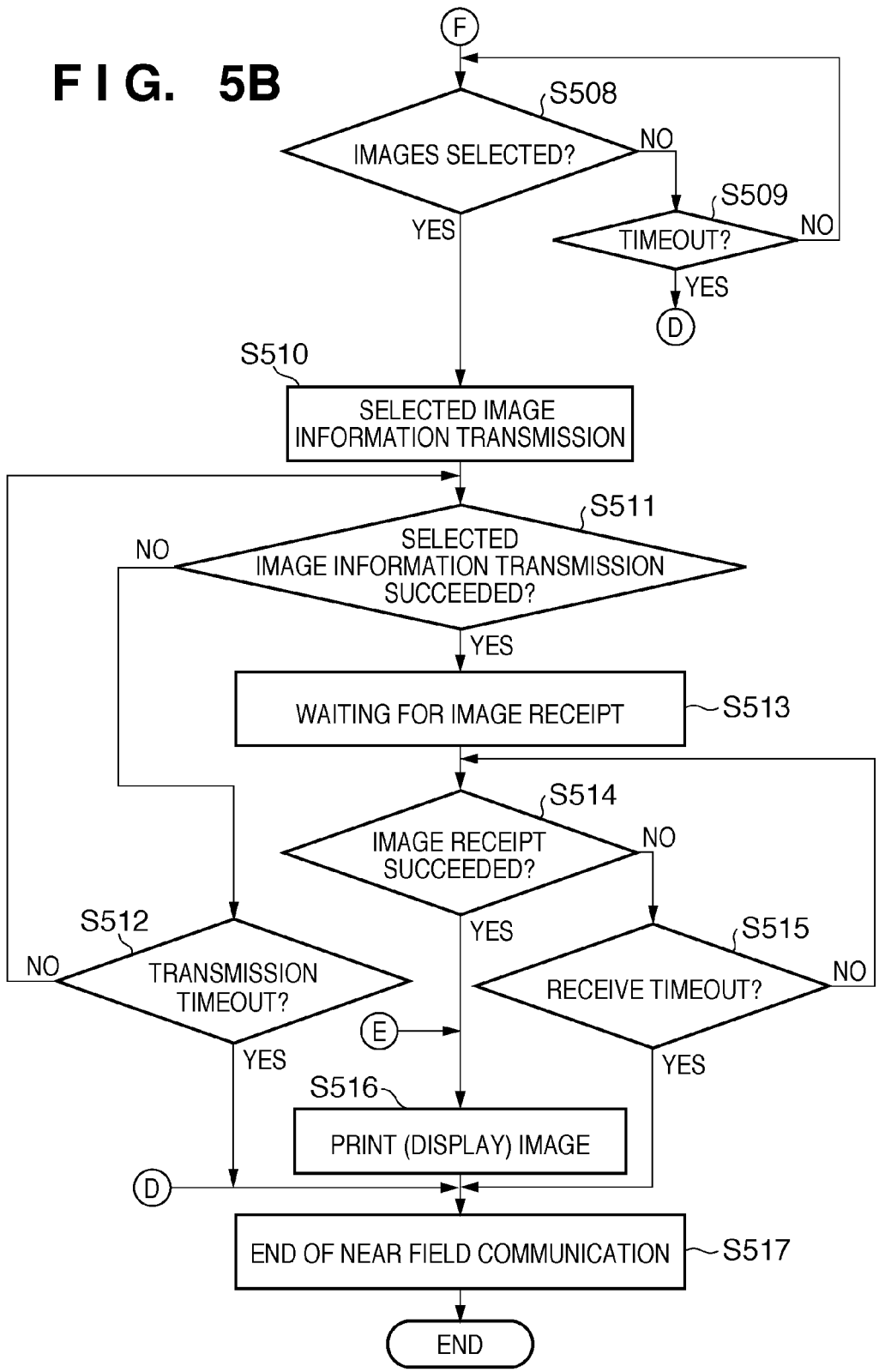

INFORMATION PROCESSING APPARATUS, SYSTEM AND CONTROL METHOD FOR TRANSMITTING DATA ENABLING SELECTION OF AN IMAGE TO BE TRANSMITTED

CROSS REFERENCE TO RELATED APPLICATIONS

This application is a continuation of U.S. application Ser. No. 12/988,281, filed Oct. 15, 2010, which is a national phase filing under 35 U.S.C. 371 based on International Publication No. PCT/JP2009/060300, filed May 29, 2009. The entire disclosures of those earlier applications are hereby incorporated by reference herein.

TECHNICAL FIELD

The present invention relates to a wireless communication system for communicating data by utilizing near field communication function when an apparatus is placed in the region within communication range.

BACKGROUND ART

As an existing technology to realize near field communication, there is known RFID (Radio Frequency Identification) or NFC (Near Field Communication).

Recently, a non-contact transfer technology called 'Transfer JET' is developed. In this transfer technology, power supply is required, communication distance is a maximum of 3 cm, but data transfer speed is very high, that is, 560 Mbps.

In existing wireless communication terminals, in order to transmit a recorded image through wireless communication and to print out said image, a user must perform complicated operations such as selecting the image, initiating a transmitting function using a menu screen and specifying a communicating party.

As a known technology, when a plurality of files is transmitted from a data transmitting apparatus to data processing apparatus, there is a wireless communication system which provides an interface displayed in the data processing apparatus, for selecting the file to be transmitted (Japanese Patent-Laid-Open 2006-020078). Namely, a data receiving apparatus displays file information regarding files capable of being transmitted from the transmitting apparatus and the receiving apparatus provides a user interface for selecting a file to be transmitted.

As another known technology, an information processing system is known wherein the adjacency or contact of a communication apparatus is detected and the processing specified by information transmitted from the detected apparatus is executed by an application program (Japanese Patent-Laid-Open No. 2006-157392).

When near field communication system is utilized, there is a convenience that an image recorded in a first wireless communication terminal is transmitted to a second wireless communication terminal only by moving the first wireless communication terminal close to the second wireless communication terminal.

However, there is a disadvantage in that the image in the first wireless communication terminal cannot be transferred when the image is not in the selected state. Further, there is no prior art notifying the user of that state and conveniently specifying the image to be transferred.

DISCLOSURE OF INVENTION

According to an aspect of the present invention, in an information processing system where information selected in response to the establishment of the communication is transmitted, the operability is improved in a case in which the information to be transmitted is not selected.

According to one aspect of the present invention, there is provided an information processing apparatus for transmitting and receiving information through communication established relative to an external apparatus, comprising: establishment means for establishing the communication relative to the external apparatus; determination means for determining whether information to be transmitted for specific processing by the external apparatus is selected; first transmission means for transmitting, via the communication, selection information indicating information that is selectable as a subject to be transmitted when the determination means determines that information to be transmitted for specific processing is not selected; reception means for receiving designation information designating information to be transmitted via the communication, in response to transmission of the selection information; and second transmission means for transmitting selected information via the communication when the determination means determines that information to be transmitted is selected, and for transmitting information designated by the designation information via the communication when the determination means determines that information to be transmitted is not selected.

According to another aspect of the present invention, there is provided an information processing apparatus for transmitting and receiving information through communication established relative to an external apparatus, comprising: establishment means for establishing the communication relative to the external apparatus; determination means for determining whether information received via the communication established by the establishment means is information selected as a subject for specific processing by the information processing apparatus, or is selection information for selecting information subject to the specific processing; execution means for executing the specific processing on the received information when the determination means determines that the received information is information selected as a subject for specific processing; user interface means for allowing a user to select information to be transmitted from the external apparatus by using the selection information when the determination means determines that the received information is the selection information; and transmission means for generating designation information in response to selection operation by the user via the user interface means, the designation information being for designating information to be transmitted from the external apparatus and subject to specific processing, and for transmitting the designation information to the external apparatus.

According to still another aspect of the present invention, there is provided an information processing system for transmitting and receiving information between first and second information processing apparatuses, comprising: establishment means for establishing communication between the first and second information processing apparatuses; determination means for determining, in the first information processing apparatus, whether information to be transmitted for specific processing by the second information processing apparatus is selected when the communication is established; first transmission means for transmitting, from the first information processing apparatus to the second information processing apparatus via the communication, selection information representing information selectable for transmission when the determination means determines that information to be transmitted for specific processing is not selected, user interface means for allowing a user to select information using the selection information when the second information processing apparatus receives the selection information; second transmission means for transmitting designation information indicating the information selected by the user through the user interface means from the second information processing apparatus to the first information processing apparatus via the communication; third transmission means for transmitting the selected information when the determination means determines that information to be transmitted for specific processing is selected, and for transmitting the information designated by the designation information when the determination means determines that information to be transmitted for specific processing is not selected, from the first information processing apparatus to the second information processing apparatus via the communication; and execution means for executing the specific processing on the information transmitted by the third transmission means in the second information processing apparatus.

According to yet another aspect of the present invention, there is provided a control method of an information processing apparatus for transmitting and receiving information via a communication established relative to an external apparatus, comprising: a establishing step of establishing the communication relative to the external apparatus; a determination step of determining whether the information to be transmitted for specific processing by the external apparatus is selected; a first transmission step of transmitting, via the communication, selection information indicating information that is selectable as a subject to be transmitted when the determination step determines that information to be transmitted for specific processing is not selected; a receiving step of receiving designation information designating information to be transmitted via the communication, in response to transmission of the selection information; and a second transmission step of transmitting the selected information via the communication when the determination step determines that information to be transmitted is selected, and of transmitting information designated by the designation information via the communication when the determination step determines that information to be transmitted is not selected.

According to still yet another aspect of the present invention, there is provided a control method of an information processing apparatus for transmitting and receiving information through communication established relative to an external apparatus, comprising: an establishing step of establishing the communication relative to the external apparatus, a determining step of determining whether information received through the communication established in the establishing step is information selected as a subject for specific processing by the information processing apparatus or is selection information for selecting information subject to the specific processing; an executing step of executing the specific processing on the received information when the determining step determines that the received information is information selected as a subject for specific processing; a user interface step of providing a user interface for allowing a user to select information to be transmitted from the external apparatus by using the selection information when the determining step determines that the received information is the selection information; and a transmission step of generating designation information in response to selection operation by the user via the user interface, the designation information being for designating information to be transmitted from the external apparatus and subject to the specific processing, and of transmitting the designation information to the external apparatus.

According to yet still another aspect of the present invention, there is provided a control method of an information processing system for transmitting and receiving information between first and second information processing apparatuses, comprising: an establishing step of establishing the communication between the first and second information processing apparatuses; a determining step of determining, in the first information processing apparatus, whether information to be transmitted for specific processing in the second information processing apparatus is selected when the communication is established; a first transmission step of transmitting, from the first information processing apparatus to the second information processing apparatus via the communication, selection information representing information selectable for transmission when the determination step determines that information to be transmitted for specific processing is not selected; a user interface step of providing a user interface for allowing a user to select information by using the selection information when the second information processing apparatus receives the selection information; a second transmission step of transmitting designation information indicating the information selected by the user through the user interface from the second information processing apparatus to the first information processing apparatus via the communication; a third transmission step of transmitting the selected information when the determination step determines that information to be transmitted for specific processing is selected, and of transmitting the information designated by the designation information when the determination step determines that information to be transmitted for specific processing is not selected, from the first information processing apparatus to the second information processing apparatus via the communication; and an execution step of executing the specific processing on the information transmitted in the third transmission step.

Further features of the present invention will become apparent from the following description of exemplary embodiments with reference to the attached drawings

BRIEF DESCRIPTION OF DRAWINGS

FIG. 2 is a block diagram of a digital camera as a first wireless communication apparatus according to the first embodiment.

FIG. 3 is a block diagram of a printer as a second wireless communication apparatus.

FIGS. 5A and 5B are flowcharts showing the process of image receiving in printer 101.

BEST MODE FOR CARRYING OUT THE INVENTION

The preferred embodiments according to the present invention will be described in detail with reference to the accompanying drawings.

First Embodiment

In the first embodiment, as an information processing system for transmitting and receiving information between first and second information processing apparatuses through established communication, a configuration where two wireless communication apparatuses transmit and receive the information by establishing near field communication will be explained. Particularly, in this embodiment, the image communication system wherein the first information processing apparatus (first wireless communication apparatus) is a digital camera and the second information processing apparatus (second wireless communication apparatus) is a printer will be explained. In the embodiment described below, transmitting and receiving the information in response to the established near field communication will be explained, but the present invention is not restricted to this configuration. For example, the present invention can be applied to the case where information is transmitted and received in response to the establishment of communication by wired communication such as USB.

Figure 1:
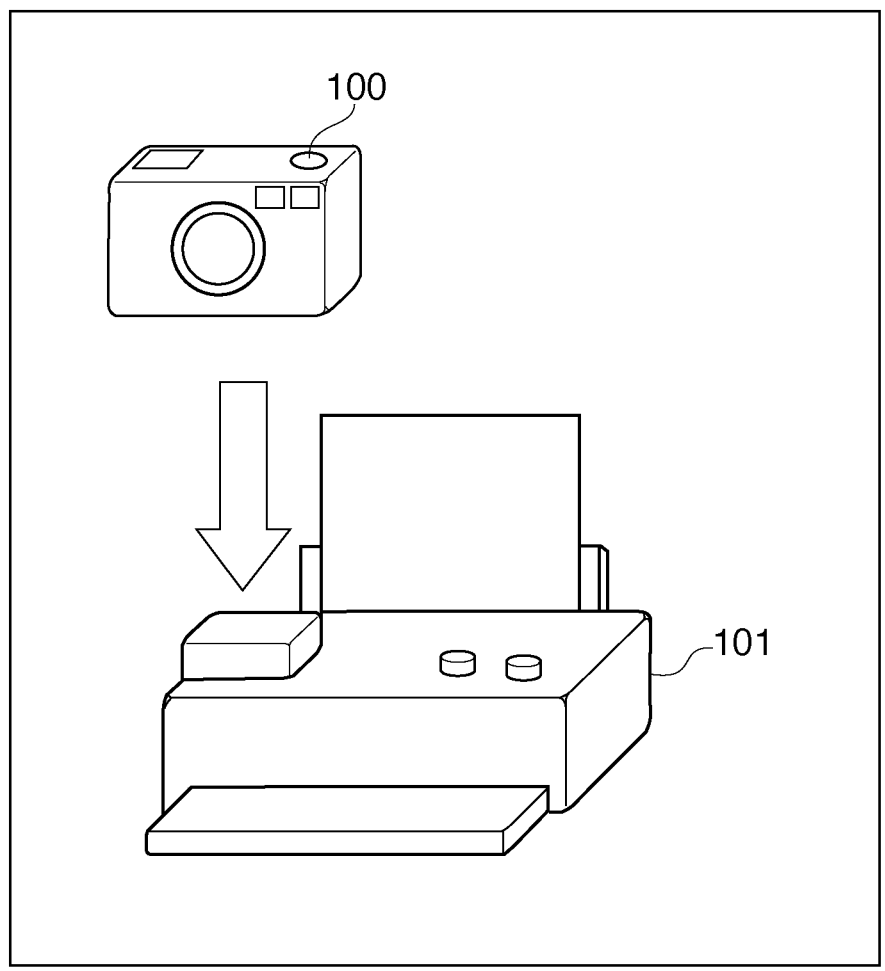
FIG. 1 is a diagram of a wireless communication system according to an embodiment of the present invention.

FIG. 1 is a structural diagram of an image communication system according to the first embodiment. In FIG. 1, reference numerals 100 and 101 represent one configuration of the wireless communication apparatus according to the present invention; the first wireless communication apparatus is embodied by a digital camera 100 and the second wireless communication apparatus is embodied by a printer 101.

The digital camera 100 and the printer 101 both have near field communication functions not shown in FIG. 1. When the digital camera 100 is moved close to the region within a near field communication range of the printer 101 having the same near field communication function, communication between the digital camera 100 and the printer 101 is established and information transmission and receipt between the two are enabled.

FIG. 2 is a block diagram of a digital camera 100 as the first wireless communication apparatus.

In FIG. 2, the reference numeral 201 denotes a system control unit for controlling the whole of the digital camera 100; 202 denotes an image processing unit and includes a thumbnail generating unit for generating thumbnails of saved images; 203 denotes a ROM for storing a control instruction, namely a program; 204 denotes a RAM including the memory area for storing a captured image; 205 denotes a near field communication unit for performing control of the near field communication; 206 denotes an antenna and 207 denotes an antenna control unit; 208 denotes an image capturing unit which receives pixel signals input from CCD 209; 210 denotes a card interface (card I/F) for controlling a recording media card for storing captured image and setting information; 214 denotes a recording media card connected to the card I/F 210. Needless to say, the recording media card 214 can be removable relative to the card I/F 210. Reference numeral 211 denotes a display unit; 212 denotes an operation unit and provides operability such as capturing instruction, playback and various settings; 213 denotes a power unit.

FIG. 3 is a block diagram of the printer 101 as the second wireless communication apparatus.

Reference numeral 301 denotes a system control unit which controls all functions of the printer 101; 302 denotes an image processing unit; 303 denotes a ROM storing a control instruction, namely a program; 304 denotes a RAM including a storage area for storing a received image data or thumbnail data; 313 denotes a power supply unit; 308 denotes a sheet-feed/delivery unit for sheet-feed and delivery of printer sheets and 309 denotes a printer engine for controlling print of the printer; 310 denotes a card interface (I/F) for controlling a recording media card storing the image data; 314 denotes a recording media card connected to the card I/F 310. Needless to say, the recording media card 314 is removable from the card I/F 310. Reference numeral 311 denotes a display unit and has a function of displaying the image data or thumbnail data stored in the RAM 304 or the recording media card 314; 312 denotes an operating unit and has a function of allowing image selection from displayed thumbnails; 305 denotes a near field communication unit for controlling communication; 306 denotes an antenna and 307 denotes an antenna control unit.

The above is a hardware layout of the digital camera 100 and the printer 101. Needless to say, the above-described hardware construction is one example of configuration of the embodiment according to the present invention, and the present invention need not include all elements of the above hardware construction; as far as a hardware construction can realize the aspect of the present invention, such construction is within the scope of the invention.

Next, the operation of the digital camera 100 and the printer 101 according to the first embodiment will be explained.

Figure 4A:
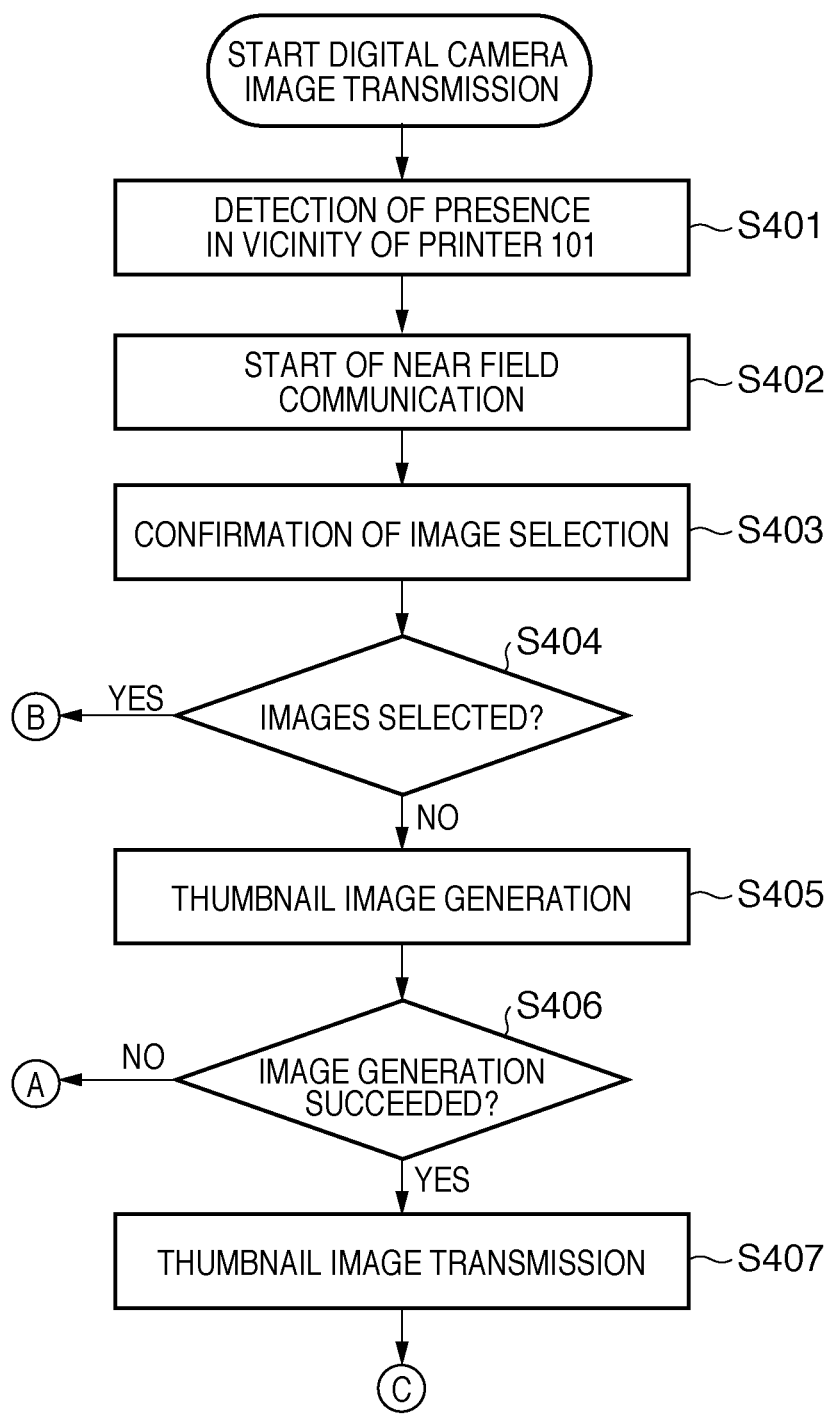
FIGS. 4A and 4B are flowcharts showing the process of image transmission in digital camera 100.
Figure 4B:
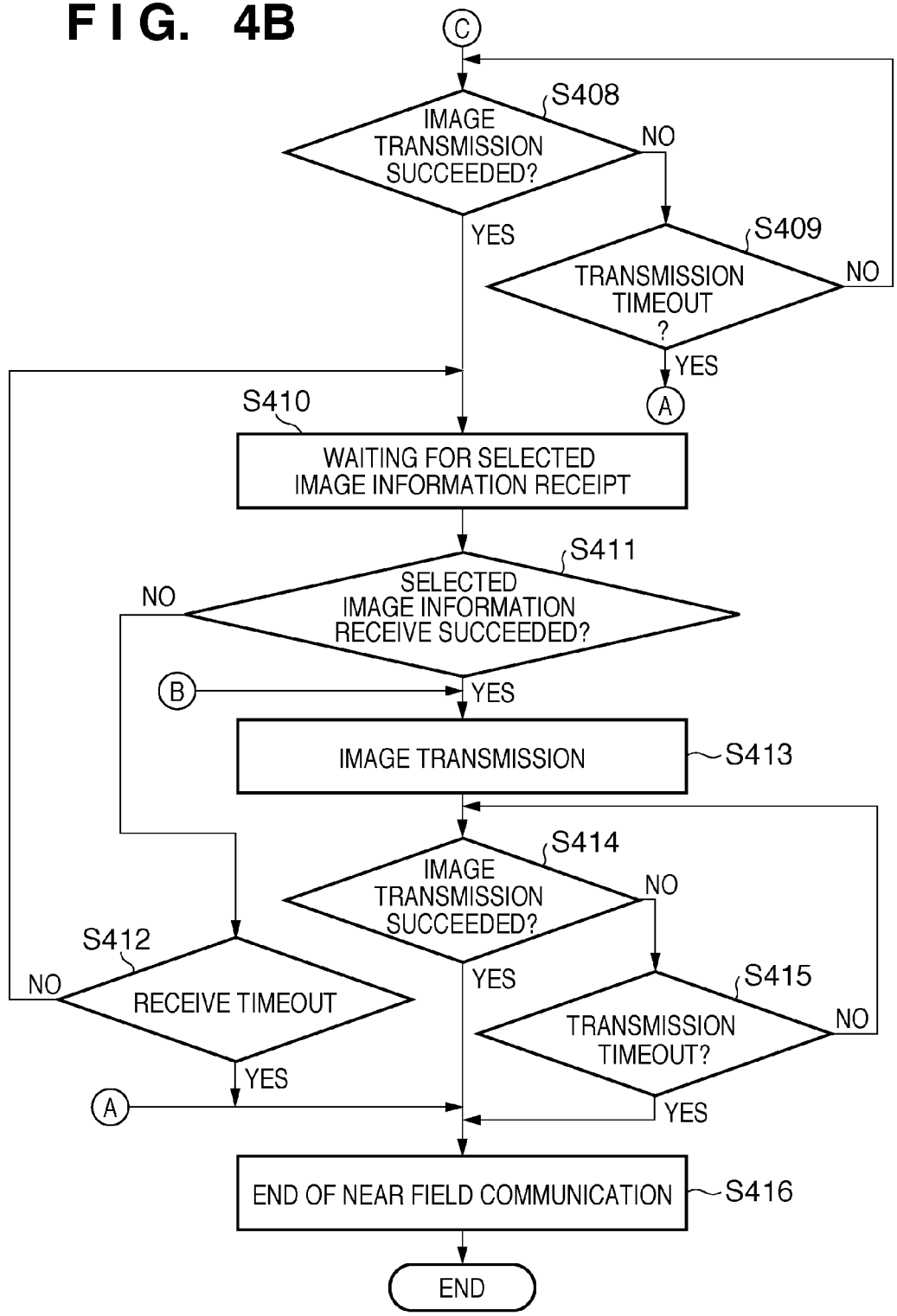

FIGS. 4A and 4B are flowcharts depicting image data transmission by the digital camera 100.

In FIGS. 4A and 4B, when the digital camera 100 is placed in a region within communication range of the printer 101, the near field communication unit 205 of the digital camera 100 and the near field communication unit 305 of the printer 101 detect each other (step S401). If the near field communication unit 205 of the digital camera 100 and the near field communication unit 305 of the printer 101 each other, then the near field communication between the digital camera 100 and the printer is started (Step S402). Thus the digital camera 100 establishes communication with the printer 101 as an external apparatus. As a result, a wireless communication link via near field communication is established and wireless image transmission between the digital camera 100 and the printer 101 can be realized.

In a digital camera 100, the recording media card 214 connected to the RAM 204 or the card I/F 210 functions as the first storage unit for storing the captured image. The image stored in the recording media which is connected to the RAM 204 or the card I/F 210 is displayed in the display unit 211. The user can select a desired image, as an image for transmission, from the images stored in the first storage unit by operating the operating unit 212.

When the near field communication unit 205 is started, the system control unit 201 of the digital camera 100 confirms the image selection state of the images stored in the first storage unit. That is, the system control unit 201 confirms whether one or more images among the images stored in the RAM 204 or a recording medium connected to the card I/F 210 have been selected as images for transmission (step S403).

In other words, in step S403, it is determined whether the information to be transmitted is selected when communication (near field communication) is established in steps S401 and S402. Based on this determination, the transmission processing to the external apparatus (printer 101) is controlled. More specifically, when it is determined that information to be transmitted is not selected in step S403:

selection information showing the information capable of selection as the subject of transmission is transmitted to the external apparatus through the communication established by steps S401 and S402 (first transmission processing: steps S405-S407);

in response to the transmission of the selection information, designation information designating information to be transmitted is received from the external apparatus through the communication (steps S410, S411); and information designated by the designation information is transmitted through the communication (second transmission processing: step S413).

The selection information (thumbnail image) includes information (for example, the file name) for designating the information to be processed (for example, an image to be printed or to be processed for display), which is used for generating the designation information. In the case of a user interface for allowing the user to select the desired information by displaying/printing a thumbnail image or a file name, for example, a list of thumbnail images or file names in which number is assigned to the thumbnail image or file name is displayed/printed. Thus, the user can select the desired information by inputting the number. If the printer is equipped with the touch panel, the user can select by touching the display position of the thumbnail image or the file name.

On the other hand, when it is determined that the selection is completed in step S403, the selected information is transmitted through the communication established in steps S401 and S402 (the second transmission processing: step S413).

Processing associated with these will be explained in detail hereinafter. In the processing to be explained hereinafter, the thumbnail image for the image data capable of being transmitted is used as the selection information and the selected image information that designates an image to be transmitted is used as the designation information.

The system control unit 201 starts transmission processing (step S413) when it confirms that the image is in the selected state by the user (YES in step S404). That is, the system control unit 201 transfers the image in the selected state to the near field communication unit 205 from the RAM 204 or the recording medium card 214 connected to the card I/F 210. Then, the image is transmitted to the printer 101 through the antenna control unit 207 and antenna 206.

On the other hand, the system control unit 201 starts processing for generating thumbnail images (step S405) if it determines there is no image in the selected state (NO in step S404). In processing for generating the thumbnail image, the system control unit 201 generates thumbnail images of the image data stored in the RAM 204 or a recording medium card 214 connected to the card I/F 210 by using the thumbnail generating unit of the image processing unit 202.

Here, that there is no image in the selected state means that the image data to be transmitted through the established near field communication is not specified. More concretely, this corresponds to the digital camera 100 being in the capture mode, menu mode, power save mode or power off mode, or the like. While, the digital camera 100 being in the reproducing mode is considered an example of there being an image in the selected state. In this case, the image in the selected state is the displayed image in the reproducing mode.

Recently, the capacity of the RAM 204 or the recording media card 214 connected to the card I/F 210 has become large and is capable of storing many thousands of images. Accordingly, thumbnail image generation for all stored images may require a significant amount of time and is sometimes impractical.

It is preferred that the number of thumbnail images to be generated is restricted using one or more rules when generating thumbnail images, for example, the number of thumbnail images generated must be less than a set upper bound;

the capture date of the image for thumbnail generation must be a designated date.

If generation of the thumbnail images succeeded (YES, in step S406), the system control unit 201 transmits the generated thumbnail image to the printer 101 (step S407). That is, the system control unit 201 transfers the thumbnail image to the near field communication unit 205 from the RAM 204 or the recording media card 214 connected to the card I/F 210 and transmits the same to the printer 101 through the antenna control unit 207 and the antenna 206. As will be described later with reference to FIGS. 5A and 5B, the printer 101 provides a user interface for the selection operation of the desired image by using the transmitted thumbnail image.

On the other hand, if generation of thumbnail images failed (NO, in step S406), the system control unit 201 deactivates the wireless communication link by near field communication unit 205, and the near field communication is terminated (step S416). Here, thumbnail image generation failure occurs when an error is incurred during the encoding operation of the thumbnail images or when the memory capacity is lacking for storing the thumbnail images.

If transmission of the image by the near field communication unit 205 succeeds (YES in step S408), the system control unit 201 transitions to a waiting status for receiving the selected image information (designation information) transmitted from the printer 101 (step S410). On the other hand, if the transmission of the image by the near field communication unit 205 fails (NO in step S408), the system control unit 201 transitions to a waiting status for timeout (step S409) and retransmits the image selection information until the timeout is reached (NO in step S409). When the transmission time out occurs (YES in step S409), the control unit 201 deactivates the wireless communication link by using the near field communication unit 205 and near field communication is terminated (step S416).

Using the printer 101, the user can select the desired image for printing from among the thumbnail images transmitted from the digital camera 100 in step S407 by the operating unit 312. When an image is selected, the printer 101 transmits information (designation information) indicative of the selected image to the system control unit 201 of the digital camera 100 through the near field communication unit 205.

The system control unit 201 of the digital camera 100 transmits the selected image to the printer 101 (step S413) if it succeeds in receiving the selected image information (designation information) from the printer 101 (YES in step S411). That is, the system control unit 201 transfers the image data selected by the designation information, from the RAM 204 or the recording media card 214 connected to the card interface 210, to the near field communication unit 205, and transmits the same to the printer 101 through the antenna control unit 207 and the antenna 206.

In contrast, if the system control unit fails to receive the selected image information (NO in step S411), it transitions to a waiting status to receive until receive timeout (NO in step S412). If the receiving timeout occurs (YES in step S412), it deactivates the wireless communication link by using the near field communication unit 205 and the near field communication is terminated (step S416).

If the near field communication unit 205 succeeds in image transmission (YES in step S414), the system control unit 201 deactivates the wireless communication link by using near field communication unit 205 and near field communication is terminated (step S416). In contrast, if the near field communication unit 205 fails in image transmission (NO in step S414), the system control unit 201 transitions to a waiting status for transmission timeout (step S415) and continues to retransmit the image data until the transmission timeout (NO in step S415). If the transmission timeout occurs (YES in step S415), the system control unit 201 deactivates the wireless communication link by using the near field communication unit 205 and near field communication is terminated (step S416).

Figure 5A:
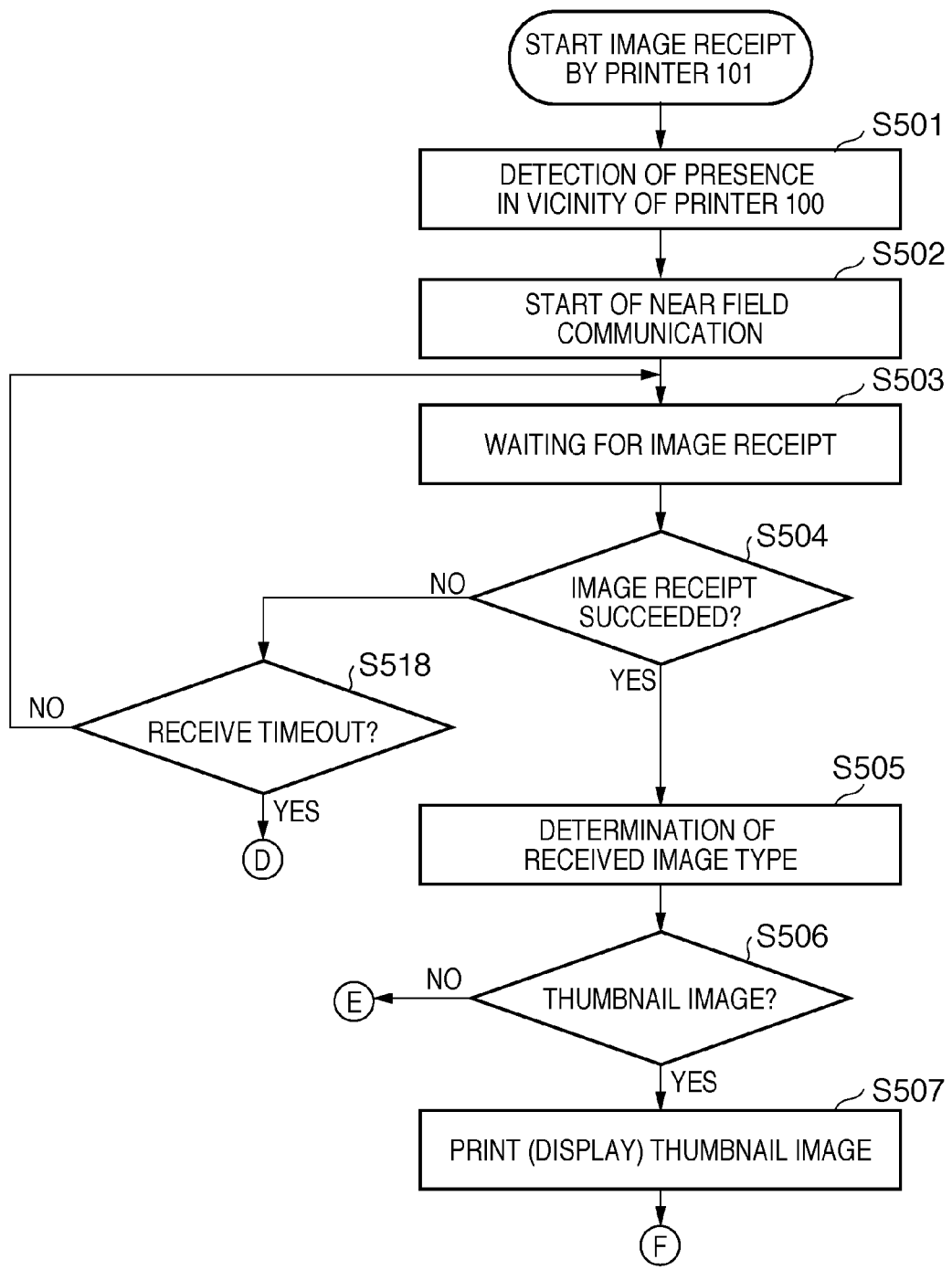

Next, the operation of the printer 101 (the processing of system control unit 301) will be explained. FIGS. 5A and 5B are flowcharts showing the processing by system control unit 301 when the printer 101 receives an image.

In FIGS. 5A and 5B, it is detected that the digital camera 100 is placed in the region within communication range of the printer 101 (step S501). Then, the near field communication unit 205 of the digital camera 100 and the near field communication unit 305 of the printer 101 detect each other, and near field communication between the digital camera 100 and the printer 101 is started (step S502). As a result, the wireless communication link via near field communication between the digital camera 100 and the printer 101 is established and wireless image transmission between the digital camera 100 and the printer 101 is enabled. Thus, communication (near field communication) with the external apparatus (digital camera 100) is established, and the system control unit 301 transitions to a waiting status for receiving, from the digital camera 100, an image or a thumbnail image (step S503).

If the system control unit 301 fails to receive the image or thumbnail image (NO in step S504), it transitions to a waiting status for receiving timeout (step S518) and continues the waiting status for receiving (NO in step S518). If the receive timeout occurs (YES in step S518), the system control unit deactivates the wireless communication by using the near field communication unit 305 and near field communication is terminated (step S517).

If the system control unit 301 succeeds in receiving the image data or thumbnail image (YES in step S504), it stores the image data or thumbnail image received by the near field communication unit 305. The location for storing the image data or the thumbnail image can be considered to be the RAM 304, the recording medium card 314 connected to the card I/F 310, or the like.

The system control unit 301 determines whether the received image is that subject to print processing or display processing, or is a thumbnail image (step S505). That is, in step S505, it is determined whether the information received through the communication established in step S502 is the selected information subject to specific processing (print processing/display processing), or the selection information (thumbnail image) used for selecting information subject to specific processing.

In response to the determination result, the following processing is carried out:

If it is determined to be the selected information (determined to be the image data subject to print/display processing) the specific processing of the received information is executed (steps S506, S516)

If it is determined to be the selection information (determined to be a thumbnail image), then the interface is provided by utilizing the selection information, which allows the user to select information to be transmitted from the external apparatus (step S507, S508), and in response to the selecting operation by the user, generating the designation information (the selected image information) and transmitting the same to the external apparatus (step S508, S510).

This processing will be explained in detail hereinafter.

If the received image is not a thumbnail image (NO in step S506), the system control unit 301 prints or displays the received image (step S516). That is, the system control unit 301 transfers, from the RAM 304 or the recording media card 314 connected to the card I/F 310, the received image to the display unit 311 for display or to the sheet-feed/delivery unit 308 for printing.

If the received image is a thumbnail image (YES in step S506), the system control unit 301 prints or displays the thumbnail image (step S507). That is, the system control unit 301 transfers, from the RAM 304 or the recording media card 314 connected to the card I/F 310, the received thumbnail image to the display unit 311 for display or to the sheet-feed/delivery unit 308 for printing. Thus, the system control unit 301 provides the user interface for allowing the user to select the desired image by presenting the thumbnail image stored in the RAM 304 or the recording media card 314 as the visible image. The user can select the desired image through this user interface by operating the operating unit 312.

As described above, the user can select the desired image through the operating unit 312 by the thumbnail image displayed on the display unit 311 or printed out from sheet-feed/delivery unit 308. As a result, the user can select the desired image to be transmitted from the digital camera 100 (step S508).

When the system control unit 301 confirms that the image data has been selected by the user's selection operation (YES in step S508), it transmits the selected image information indicating an image to be in the selected state to the digital camera 100 (step S510). That is, the system control unit 301 transfers the selected image information to the near field communication unit 305 and transmits the same to the digital camera 100 through the antenna control unit 307 and antenna 306.

If the system control unit 301 confirms that any image has not been selected by the user (NO in step S508), it starts the timer and waits for the user's selection until the timeout (in step S509, NO). If a timeout occurs (NO in step S509), the system control unit 301 deactivates the wireless communication link by using the near field communication unit 305 and near field communication is terminated (step S517).

If the near field communication unit 305 succeeds in the transmission of the selected image information (YES in step S511), the system control unit 301 transitions to a waiting status for receiving a selected image transmitted from the digital camera 100 (step S513). While the near field communication unit 305 fails in the transmission of the selected image information (NO in step S511), the system control unit 301 transitions to a waiting status for the transmission timeout (step S512), and it continues to retransmit the selected image information until the transmission timeout (in step S512, NO). If the transmission timeout occurs (YES in step S512), it deactivates the wireless communication link by using the near field communication unit 305 and near field communication is terminated (step S517).

If the system control unit 301 succeeds in receiving an image corresponding to the selected image information (YES in step S514), it transfers the received selected image to the RAM 304 or the recording media card 314 connected to the card I/F 310 and retains it. Further, the system control unit 301 transfers the received image to the display unit 311 for display or to the sheet-feed/delivery 308 unit for printing (step S516).

However, if the system control unit 301 fails in receiving the image (NO in step S514), it transitions to a waiting status for the receive timeout (step S515), and continues the waiting status for receiving until the receive timeout (NO in step S515). If the receive timeout occurs (YES in step S515), it deactivates the wireless communication link by using near field communication unit 305 and near field communication is terminated (step S517).

As described above, according to the first embodiment, when the image data to be transmitted from the digital camera 100 to the printer 101 is not selected, the digital camera 100 transmits the thumbnail image for the transmittable image to the printer 101, and the desired image can be selected at the printer 101 by using the thumbnail image. According to the first embodiment, in the information processing system where the selected information is transmitted in response to the establishment of the communication, even if the information to be transmitted is not selected at the establishment of the communication, it is possible to select information (image) to be transmitted easily and operability is improved.

In the above embodiment, the case where the communication format established between the first information processing apparatus (digital camera 100) and the second information processing apparatus (printer 101) is near field communication was explained, but the communication format is not limited to this. For example, wired communication such as USB communication or the like may be used. In this case, the establishment of communication is realized by the connection of both apparatuses via USB cable. Also, in the above embodiment, as the selection information for selecting image subject to a specific processing, a thumbnail image is used, but the present invention is not limited to this. For example, in a case wherein a PDA (Personal Digital Assistant) is used as the first information processing apparatus, the information subject to the specific processing can be the document data, and a document file name or its property information can be used as the selection information for selecting the information. Further, in the above embodiment, a thumbnail image is generated when any image is not placed in the selected state, however a pre-generated thumbnail image may also be transmitted.

Second Embodiment

Figure 6:
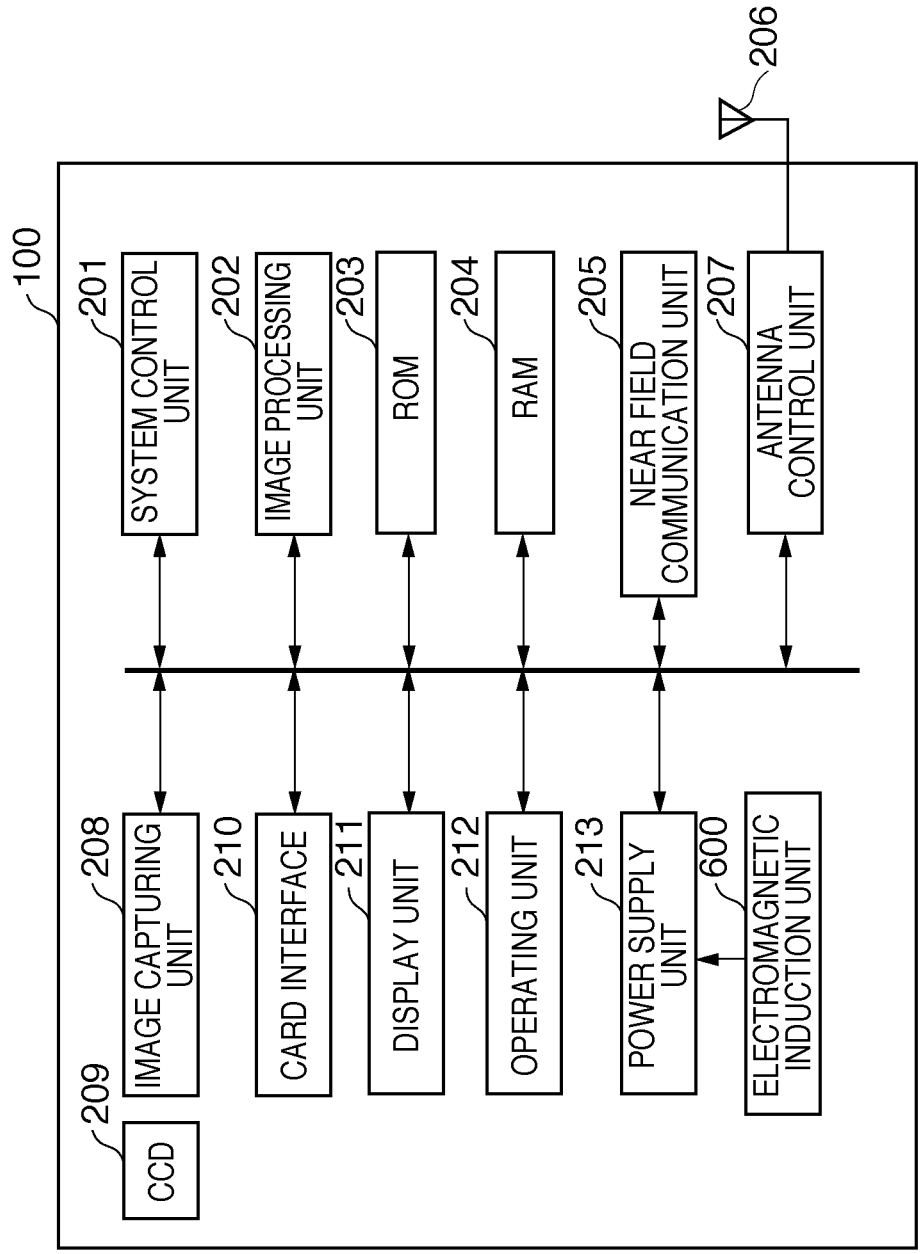
FIG. 6 is a block diagram of a digital camera as a first wireless communication apparatus according to the second embodiment.
Figure 7:
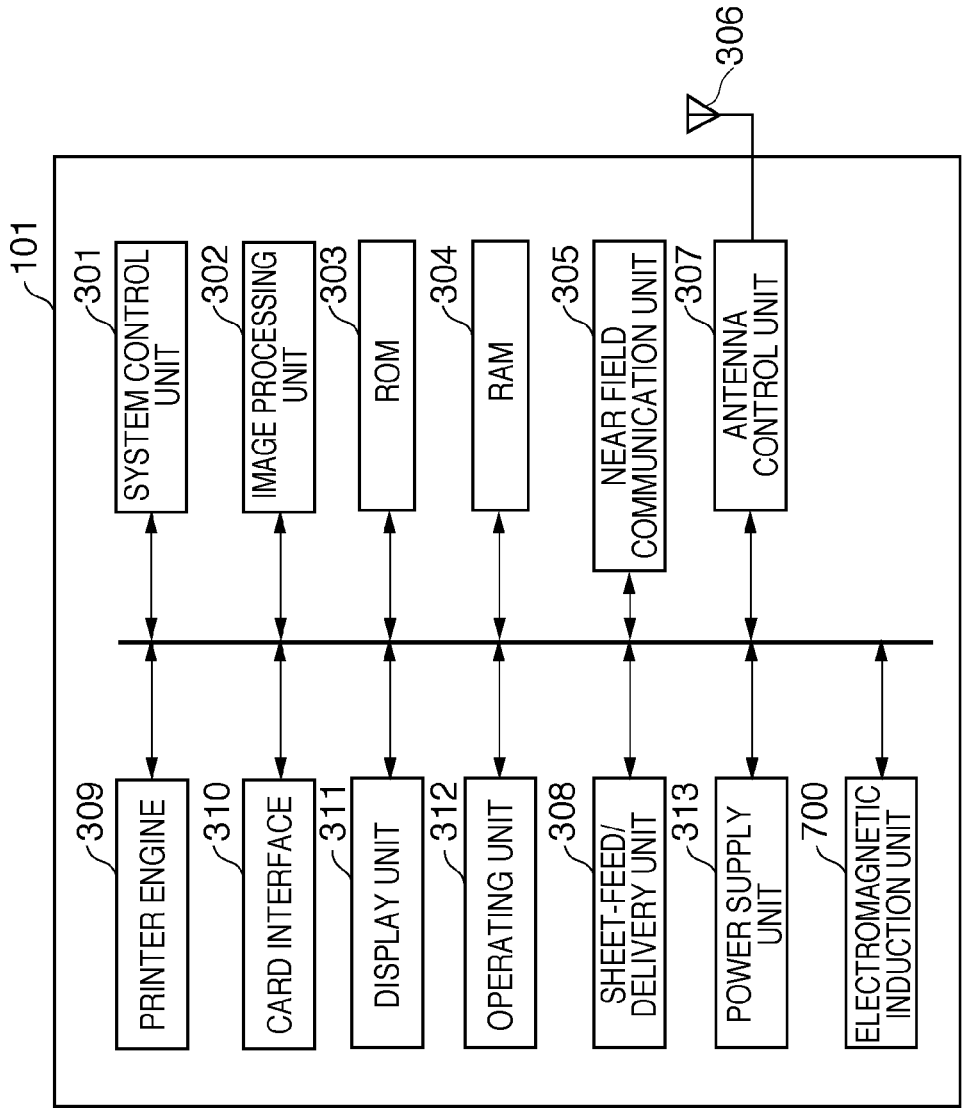
FIG. 7 is a block diagram of a printer as a second wireless communication apparatus according to the second embodiment.

Next, a second embodiment of the present invention will be explained. FIG. 6 is a block diagram showing the configuration of the digital camera 100 according to the second embodiment. FIG. 7 is a block diagram showing the configuration of the printer 101 according to the second embodiment.

The difference between the first and second embodiments will now be explained. In the second embodiment, an electromagnetic induction unit 600 is added to the digital camera 100 (FIG. 6) and an electromagnetic induction unit 700 is added to the printer 101 (FIG. 7). The electromagnetic induction unit 600 is connected to a power supply unit 213 and forms a power control unit.

In the first embodiment, even if the digital camera 100 is placed in a region within communication range of the printer 101, the digital camera 100 and the printer 101 cannot detect each other if the power supply unit 213 of the digital camera 100 is not in an ON state. That is, both the digital camera 100 and the printer 101 must be in a power-on state in order for both near field communication units 205 and 305 to detect each other and for near field communication between the digital camera 100 and the printer 101 to start.

However, in the second embodiment, even if the digital camera 100 is in a power-off state, when the digital camera 100 is placed in the region within communication range of the printer 101, the power supply of the digital camera is automatically turned on. More specifically, by the magnetic field generated by a coil shaped antenna in the electromagnetic induction unit 700 of the printer 101, a coil shaped antenna in the electromagnetic induction unit 600 of the digital camera 100 is energized, thereby supplying a starting signal to the power supply unit 213 and starting the supply of power to the power supply unit 213.

In the digital camera 100 which is in the start-up state, if the system control unit 201 determines that any image is not selected by the user, then a thumbnail image for an image stored in the RAM 204 or the recording media connected to the card I/F 210 is generated by the thumbnail generating unit in the image processing unit 202. The generated thumbnail image is transferred from the RAM 204 or the recording media connected to the card interface 210 to the near field communication unit 205, and is transmitted to the printer 101 through the antenna control unit 207 and the antenna 206.

The subsequent sequence is same as that of the first embodiment.

As described above, in the second embodiment, when the digital camera 100 in power off state is moved closed to the printer 101, the power supply of the digital camera 100 is automatically turned on and the near field communication between both apparatuses is established. Then, because the image to be processed is not selected in the digital camera 100 soon after its power supply is turned on, thumbnail images as the selection information are immediately transmitted to the printer 101. Accordingly, in the second embodiment, when the digital camera 100 in the power-off state is moved close to the printer 101, image selection can be immediately realized and operability is thereby improved.

According to the present invention, in the image processing system where the selected information is transmitted in response to the establishment of communication, even if information to be transmitted is not in the selected state, the information to be transmitted can easily be selected and operability is thereby improved.

The present invention is also achievable in embodiments such as a system, an apparatus, a method, a program, or a storage medium. Specifically, it may also be applied to a system constituted by multiple devices and may also be applied to an apparatus constituted by a single device.

Note that the case where the functionality of the above-mentioned embodiment is achieved by directly or remotely supplying a software program to a system or device and reading out and executing the supplied program code through a computer in the system or device is included in the scope of the present invention. In this case, the supplied program is a computer program that corresponds to the flowchart indicated in the drawings in the embodiment.

Accordingly, the program code itself, installed in a computer so as to realize the functional processing of the present invention through a computer, also realizes the present invention. In other words, the computer program itself, for realizing the functional processing of the present invention, is also included within the scope of the present invention.

In this case, object code, a program executed through an interpreter, script data supplied to an OS, or the like may be used, as long as it has the functions of the program.

Examples of the a computer readable storage medium that can be used to supply the computer program include Floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

Using a browser of a client computer to connect to an Internet homepage and downloading the computer program of the present invention to a storage medium such as a hard disk can be given as another method for supplying the program. In this case, the downloaded program may be a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer also falls within the scope of the present invention.

Furthermore, the program of the present invention may be encrypted, stored in a storage medium such as a CD-ROM, and distributed to users. In this case, a user that has cleared a predetermined condition is allowed to download key information for removing the cryptography from a homepage via the Internet, use the key information to decrypt the program, and install the program on a computer.

Also, the functions of the present embodiment may be realized, in addition to through the execution of a loaded program using a computer, through cooperation with an OS or the like running on the computer based on instructions of the program. In this case, the OS or the like performs part or all of the actual processing, and the functions of the above-described embodiment are realized by that processing.

Furthermore, part or all of the functionality of the aforementioned embodiment may be written into a memory provided in a function expansion board installed in the computer, a function expansion unit connected to the computer, or the like, into which the program read out from the storage medium is written. In this case, after the program has been written into the function expansion board or the function expansion unit, a CPU or the like included in the function expansion board or the function expansion unit performs part or all of the actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-146221, filed Jun. 3, 2008, which is hereby incorporated by reference herein in its entirety.

The invention claimed is:

1. A communication apparatus comprising:
    a communication unit configured to communicate with an external apparatus;
    a detection unit configured to detect that connection with the external apparatus through said communication unit has been established; and
    a transmitting unit configured to transmit selection data in case that the communication apparatus is operating in a capture mode for capturing images, the communication apparatus and the external apparatus approach each other and the detection unit detects that the connection with the external apparatus through said communication unit has been established, wherein the selection data enable a user to select an image to be transmitted from a plurality of data held by said communication apparatus.

2. The apparatus according to claim 1, further comprising a determination unit configured to determine a mode of said communication apparatus.

3. The apparatus according to claim 1, wherein the communication unit performs Near Field Communication.

4. The apparatus according to claim 1, further comprising a transfer unit configured to transfer, in response to a request from the external apparatus, image data to the external apparatus, wherein the image data is selected based on the selection data.

5. The apparatus according to claim 1, wherein the communication apparatus comprises a digital camera.

6. The apparatus according to claim 1, wherein the selection data include a thumbnail image of each of the plurality of data.

7. The apparatus according to claim 1, wherein the selection data sent by the transmitting unit is transmitted via the communication unit.

8. A method of a communication apparatus comprising a communication unit configured to communicate with an external apparatus, said method comprising:
    a detection step of detecting that connection with the external apparatus through said communication unit has been established; and
    a transmitting step of transmitting selection data in case that the communication apparatus is operating in a capture mode for capturing images, the communication apparatus and the external apparatus approach each other and it is detected in the detection step that the connection with the external apparatus through said communication unit has established, wherein the selection data enable a user to select an image to be transmitted from a plurality of data held by the communication apparatus.

9. A non-transitory computer readable storage medium storing a program causing a computer to execute each of the steps of the method according to claim 8.

10. A communication apparatus comprising:
    a communication unit configured to communicate with an external apparatus;
    a detection unit configured to detect that connection with the external apparatus through said communication unit has been established;
    a transmitting unit configured to in response that the communication apparatus and the external apparatus approach each other and the detection unit detects that the connection with the external apparatus through said communication unit has been established, perform data transfer processing in which data that is being displayed by the communication apparatus at a time of the detection by the detection unit is transmitted to the external apparatus, and configured to not perform the data transfer processing in a case that said communication apparatus is in a capture mode for capturing an image; and
    a sending unit configured to send selection data to the external apparatus in case that said communication apparatus is in the capture mode at the time of the detection by the detection unit, wherein the selection data enable a user to select an image to be transmitted from a plurality of data held by said communication apparatus.

11. The apparatus according to claim 10, wherein said transmitting unit transmits data which said communication apparatus is displaying, to the external apparatus, in case that said communication apparatus is in a reproducing mode in which said communication apparatus reproduces data at the time of the detection by the detection unit.

12. The apparatus according to claim 10, wherein said transmitting unit transmits the data which is being displayed at the time of the detection by the detection unit, using said communication unit in the data transfer processing.

13. The apparatus according to claim 10, wherein said transmitting unit transmits the data which is being displayed such that the external apparatus prints or displays the data.

14. The apparatus according to claim 10, wherein the communication unit performs Near Field Communication.

15. The apparatus according to claim 10 further comprising a selection unit configured to select an image to be displayed based on a user's operation,
wherein the transmitting unit transmits the image data selected by said selection unit to the external apparatus, in case that the image selected by said selection unit is being displayed and a state in which the connection with the external apparatus through said communication unit has not been established changed to a state in which the connection with the external apparatus through said communication unit has been established by approaching the communication apparatus and the external apparatus.

16. The apparatus according to claim 10, wherein
the external apparatus comprises a printer, and
the data transfer processing is a processing for transmitting the data to the external apparatus to cause the external apparatus to print the data.

17. The apparatus according to claim 10, further comprising a power-on unit configured to turned on a power in a case where a connection with the external apparatus through said communication unit has been established in a power off sate,
wherein, in a case where a power is turned on by the power-on unit, the transmitting unit does not perform the data transfer processing in response that the connection with the external apparatus through said communication unit has been established.

18. The apparatus according to claim 10,
wherein the data transfer processing performed by said transmitting unit is executed through a communication by the communication unit.

19. The apparatus according to claim 10, further comprising a transfer unit configured to transfer, in response to a request from the external apparatus, image data to the external apparatus, wherein the image data is selected based on the selection data.

* * * * *